United States Patent [19]

Campbell

[11] Patent Number: 4,785,375
[45] Date of Patent: Nov. 15, 1988

[54] TEMPERATURE STABLE DIELECTRIC COMPOSITION AT HIGH AND LOW FREQUENCIES

[75] Inventor: Scott S. Campbell, Youngstown, N.Y.

[73] Assignee: Tam Ceramics, Inc., Niagara Falls, N.Y.

[21] Appl. No.: 61,181

[22] Filed: Jun. 11, 1987

[51] Int. Cl.$^4$ .................. H01G 4/10; C04B 35/46
[52] U.S. Cl. ..................... 361/321; 252/62.3 BT; 501/134
[58] Field of Search .............. 361/320, 321; 501/134; 252/62.3 ZB, 62.3 BT

[56] References Cited

U.S. PATENT DOCUMENTS

| 3,380,854 | 4/1968 | Robinson | 361/321 X |
| 4,102,696 | 7/1978 | Katsube te al. | 501/134 |
| 4,148,853 | 4/1979 | Schuber | 252/62.3 BT X |
| 4,386,985 | 6/1983 | Dirstine | 501/134 X |

FOREIGN PATENT DOCUMENTS 67899 6/1978 Japan .................... 501/134

*Primary Examiner*—Donald A. Griffin
*Attorney, Agent, or Firm*—Kenyon & Kenyon

[57] ABSTRACT

The invention is directed to a dielectric ceramic having a dielectric constant K, greater than 35, a quality factor, Q, greater than 9,000 at 4 GHz and a reduction of the firing temperature to less than about 1350° C. The dielectric ceramic consists essentially of a sintered mixture of about 35 to 55 mole percent $ZrO_2$, about 30 to 50 mole percent $TiO_2$, 5 to about 22.5 mole percent $SnO_2$, about 0.5 to 10 mole percent ZnO, and 0.3 to about 2.5 mole percent CuO.

18 Claims, No Drawings

TEMPERATURE STABLE DIELECTRIC COMPOSITION AT HIGH AND LOW FREQUENCIES

FIELD OF THE INVENTION

This invention relates to dielectric ceramic compositions for use as dielectric resonators, substrates multilayer ceramic capacitors or the like for operation at low frequencies (e.g., 1 KHz) to microwave frequencies (e.g., 15 GHz). More particularly, the invention relates to a temperature stable dielectric ceramic having the properties of a dielectric constant, K, within the range of about 25 to 40; a quality factor, Q, greater than about 9,000 at 4 GHz; a temperature coefficient of frequency change, $T_f$, within the range of $\pm 60$ ppm/°C. and a firing temperature less than about 1350° C.

BACKGROUND OF THE INVENTION

Many commonly used dielectric ceramic materials are based on the titanate system. The desired properties for dielectric ceramics for use as dielectric resonators, substrates or multilayer ceramic capacitors are a high dielectric constant, a high Q and stable temperature characteristics. Low firing temperatures are advantageous since they permit the use of cheaper lower melting point electrode materials.

One prior art approach employed $Ba_2Ti_9O_{20}$ to develop a dielectric ceramics having high Q values. While barium nonatitanate is a suitable material, the temperature coefficient of frequency is generally fixed and cannot be varied without changes in stoichiometry that can produce a second phase which is deleterious to Q in the microwave region. Additionally, the best Q obtained for conventional $Ba_2Ti_9O_{20}$ is only about 9000.

SUMMARY AND OBJECTS OF THE INVENTION

Under the present invention, the addition of copper oxide is employed as a Q enhancer in a dielectric ceramic. The copper oxide also acts as a sintering aid reducing the firing temperature of the dielectric ceramic as much as 100° C. to 150° C. preferably without significant adverse affect on other electrical properties such as K and $T_f$. Thus, advantages gained over conventional dielectrics for use at microwave frequencies by the ceramics of this invention are enhanced Q obtained by the addition of CuO with a simultaneous reduction of the firing temperature by the addition of CuO and without significant adverse effects on the electrical porperties of the finished dielectric.

Another object of the present invention is to increase the quality factor, Q, of a dielectric ceramic without adversely affecting its temperature stability. As used herein, the symbol Q represents 1/tan S, wherein tan S is the dielectric loss tangent.

The present invention provides a dielectric ceramic consisting essentially of a sintered mixture of about 35 to 55 mole percent of zirconium dioxide ($ZrO_2$), about 30 to 50 mole percent of titanium dioxide ($TiO_2$), about 5 to 22.5 mole percent of stannic oxide ($SnO_2$), about 0.5 to 10 mole percent zinc oxide (ZnO) and 0.3 to about 2.5 mole percent copper oxide (CuO). X-ray diffraction analysis of the sintered mixture indicates that it has an orthorhombic crystal structure.

The preferred dielectric ceramic compositions of the present invention have a temperature coefficient of frequency, $T_f$, within about $\pm 15$ ppm/°C. in the temperature range of $-55°$ C. to 125° C. In a more preferred embodiment, a temperature coefficient of frequency of about $\pm 1$ ppm/°C. was obtained. According to the present invention, the temperature coefficient of capacitance, $T_c$, is less than about $\pm 30$ ppm/°C. within the temperature range of $-55°$ C. to 125° C. In a more preferred embodiment, a temperature coefficient of capacitance of $-11$ ppm/°C. was obtained. With the addition of CuO, Q values in excess of about 9,000 at 4 $GH_z$ were obtained.

The invention also provides a variety of devices employing this dielectric ceramic composition. One class of devices which make use of the dielectric ceramic composition of this invention are dielectric resonators. A dielectric resonator is sized and shaped such that for the frequency of the microwave energy of interest, the microwave energy is resonant (has high energy storage or Q) within the resonator. The invention also provides another class of devices which make use of the dielectric composition of this invention as multilayer capacitors which operate at low frequencies (1 KHz). A further use of the dielectric composition of this invention is as a substrate.

DETAILED DESCRIPTION OF THE INVENTION

The dielectric ceramic composition of the present invention may be prepared by techniques conventionally employed for the production of dielectric ceramic compositions. A preferred method, hereinafter described, however, requires the use of highly purified oxides. The highly purified oxides, $ZrO_2$, $TiO_2$, $SnO_2$, ZnO and CuO may be used as starting materials for the production of dielectric ceramic compositions of this invention. These high purity oxides are combined into a homogeneous mixture by either wet mixing in a tank with deionized water or ball milling with $ZrO_2$ media and deionized water.

After mixing, the homogeneous mixture is oven dried in stainless steel trays and then pulverized into a fine powder. This powder is calcined in $Al_2O_3$ or Cordierite[1] saggers at temperatures between 1000° C. and 1150° C. for 3 to 6 hours.

[1]Cordierite is a compound characterized by the chemical formula $Mg_2Al_4Si_5O_{12}$. It is widely used in the ceramic industry as a refractory material.

The calcined product is pulverized then ground into a fine powder by ball milling with $ZrO_2$ media and deionized water. The milling process proceeds until an average particle size of about 1.2 microns as determined by sedimentation techniques and a specific surface area of 3.0 m²/g as determined by conventional methods is obtained. When these conditions are satisfied, the material is again oven dried then pulverized into a fine powder.

This powder is pressed into ½ inch diameter by one inch right cylinders in a stainless steel die at a pressure between 6000 and 10,000 psi for microwave frequency resonator use or tape cast and fabricated into multilayer capacitors for low frequency (1 KHZ) use by the process for tape casting and fabricating multilayer capacitors described in detail in U.S. Pat. No. 4,540,676 the text of which is incorporated herein by reference. These parts are fired at temperatures between 1200° C. and 1400° C. for 3 to 6 hours to sinter them into dense and relatively pore free ceramic pieces.

In an especially preferred embodiment, the dielectric ceramic composition is formed from a mixture of 44.0 mole percent of zirconium dioxide ($ZrO_2$), 12.0 mole percent of stannic oxide ($SnO_2$), 44.0 mole percent of titanium dioxide ($TiO_2$), 2.0 mole percent of zinc oxide (ZnO), and 1.0 mole percent of copper oxide (CuO).

EXAMPLE

Dielectric compositions having the compositions set forth in TABLE I below were prepared in accordance with the invention.

TABLE I

| Samples | $ZrO_2$ | $SnO_2$ | $TiO_2$ | CuO | ZnO |
|---|---|---|---|---|---|
| 1 | 44 | 12 | 44 | 0.7 | 2.0 |
| 2 | 44 | 12 | 44 | 1.0 | 2.0 |
| 3 | 44 | 12 | 44 | 1.3 | 2.0 |
| 4 | 35 | 15 | 50 | 0.7 | 2.0 |
| 5 | 48 | 22 | 30 | 0.7 | 2.0 |
| 6 | 35 | 22 | 43 | 0.7 | 2.0 |
| 7 | 55 | 15 | 30 | 0.7 | 2.0 |
| 8 | 40 | 10 | 50 | 0.7 | 2.0 |
| 9 | 40 | 10 | 50 | 1.0 | 1.0 |

Each of samples 1 to 9 was fired in a muffle kill furnace for the time, and at the temperature set forth in TABLE II, and had the electrical properties shown.

$T_f$(ppm/°c.), Q and K were measured by the Hakki-Coleman method.

TABLE II

| Samples | K | Q(at 4GHz) | $T_f$(ppm/°C.) | Firing Temp. (°C. at 5 hrs) |
|---|---|---|---|---|
| 1 | 35.3 | 12,250 | −1.0 | 1300 |
| 2 | 35.6 | 10,570 | −3.1 | 1240 |
| 3 | 35.6 | 9,300 | −3.1 | 1200 |
| 4 | 35.5 | 10,500 | −12.4 | 1200 |
| 5 | 29.3 | 12,750 | −34.0 | 1225 |
| 6 | 29.1 | 13,000 | −34.0 | 1300 |
| 7 | 29.7 | 9,750 | −8.9 | 1275 |
| 8 | 37.4 | 9,688 | −1.7 | 1250 |
| 9 | 37.8 | 9,305 | 0.0 | 1175 |

It can be seen from the foregoing data that dielectric ceramics prepared in accordance with the present invention have highly desirable electrical properties for many microwave substrate and multilayer capacitor applications. In particular, they have Q values greater than about 9000, with K values greater than about 25 and low firing temperatures, i.e., less than about 1350° C. It is also apparent that the $T_f$ value can be readily adjusted in over a wide range while high Q, high K and low firing temperatures are maintained. This is a valuable feature because $T_f$ is an application dependent property meaning that whether a particular $T_f$ value high or low is desirable depends largely on what the dielectric will be used for, e.g., a substrate or a multilayer capacitor.

What is claimed is:

1. A dielectric ceramic having a K value in the range of about 25 to 40, Q greater than about 9000 at 4 $GH_z$ consisting essentially of a mixture of about 35 to 55 mole percent of $ZrO_2$, about 30 to 50 mole percent of $TiO_2$, about 5 to 22.5 mole percent of $SnO_2$, about 0.5 to 10 mole percent of ZnO, and about 0.3 to 2.5 mole percent of CuO; sintered at less than about 1350° C.

2. A dielectric resonator comprising said sintered mixture of claim 1.

3. A multilayer ceramic capacitor comprising said sintered mixture of claim 1.

4. A substrate comprising said sintered mixture of claim 1.

5. A multilayer ceramic capacitor consisting essentially of a sintered mixture of about 35 to 55 mole percent $ZrO_2$, about 30 to 50 mole percent $TiO_2$, about 5 to 22.5 mole percent $SnO_2$, about 0.5 to 10 mole percent ZnO, and about 0.3 to 2.5 mole percent CuO.

6. A multilayer ceramic capacitor according to claim 5 which comprises 44 mole percent $ZrO_2$, 12 mole percent $SnO_2$, 44 mole percent $TiO_2$, 2.0 mole percent ZnO and 1.0 mole percent CuO.

7. A composition for making dielectric ceramics useful at about 1 KHz to about 15 GHz consisting essentially of about 35 to 55 mole percent of $ZrO_2$, about 30 to 50 mole percent of $TiO_2$, about 5 to 22.5 mole percent of $SnO_2$, about 0.5 to 10 mole percent of ZnO, and about 0.3 to 2.5 mole percent of CuO.

8. A dielectric resonator comprising said dielectric ceramic composition of claim 7.

9. A substrate comprising said dielectric ceramic composition of claim 7.

10. A multilayer ceramic capacitor comprising said dielectric ceramic composition of claim 7.

11. A method of manufacturing a dielectric ceramic having a K value in the range of about 25 to 40, a Q greater than about 9,000 at 4 GHz comprising the steps of:

(a) preparing a mixture of high purity oxides consisting essentially of about 35 to 55 mole percent of $ZrO_2$, about 30 to 50 mole percent of $TiO_2$, about 5 to 22.5 mole percent of $SnO_2$, about 0.5 to 10 mole percent ZnO, and about 0.3 to 2.5 mole percent CuO;

(b) calcining said mixture at a temperature to initiate formation of a base ceramic solid solution phase;

(c) reducing the particle size of the calcined mixture;

(d) pulverizing said powdered composition;

(e) compressing said calcined mixture in a mold; and (f) firing said compressed powdered composition in air at a temperature less than about 1350° C.

12. A method of manufacture according to claim 11 wherein the particle size of said calcined mixture is reduced by milling.

13. A method of manufacture according to claim 11 wherein said mixture is calcined at a temperature within the range of about 800° C. to 1300° C. for about 3 to 6 hours.

14. A method of manufacture according to claim 13, wherein the base ceramic solid solution phase of the calcined mixture includes more than about 90% of the (Zr, Sn) $TiO_2$ orthorhombic phase.

15. A method of manufacture according to claim 13, wherein the calcined mixture is ball milled in water with $ZrO_2$ media for about 8 hours to a surface area of about 3.0 m²/g and a particle size of about 1.2 microns.

16. A method of manufacture according to claim 11, wherein the mixture of high purity oxides is ball milled in water.

17. A method of manufacture according to claim 11, wherein said powdered composition is compressed into cylinders at a pressure of about 55 MPa and fired at temperatures between 1200° C. and 1350° C. in air for about 4 to 6 hours.

18. A method of manufacture according to claim 11, wherein said compressed powdered composition is tape cast into multilayer capacitors and fired at temperatures between about 1200° C. and 1350° C. in air for about 3 hours.

* * * * *